(12) United States Patent
Yoo

(10) Patent No.: US 12,261,958 B2
(45) Date of Patent: Mar. 25, 2025

(54) DEVICE AND METHOD FOR VIRTUAL AUTHENTICATION CODE-BASED PROCESS AUTHORIZATION

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 218 days.

(21) Appl. No.: 17/801,770

(22) PCT Filed: Feb. 24, 2021

(86) PCT No.: PCT/KR2021/002335
§ 371 (c)(1),
(2) Date: Aug. 23, 2022

(87) PCT Pub. No.: WO2021/172876
PCT Pub. Date: Sep. 2, 2021

(65) Prior Publication Data
US 2023/0090508 A1 Mar. 23, 2023

(30) Foreign Application Priority Data

Feb. 24, 2020 (KR) .................. 10-2020-0022023
Feb. 24, 2021 (KR) .................. 10-2021-0025001

(51) Int. Cl.
*H04L 9/32* (2006.01)
*G06F 21/31* (2013.01)

(52) U.S. Cl.
CPC ............ *H04L 9/3231* (2013.01); *G06F 21/31* (2013.01)

(58) Field of Classification Search
CPC .............................. H04L 9/3231; G06F 21/31
See application file for complete search history.

(56) References Cited

U.S. PATENT DOCUMENTS 9,043,890 B1 * 5/2015 Luo .................. G06F 21/31
726/7
9,270,655 B1 * 2/2016 Juels ................ H04L 9/0662
(Continued)

FOREIGN PATENT DOCUMENTS

JP          6175573          7/2017
KR    10-2011-0109536        10/2011
(Continued)

OTHER PUBLICATIONS

International Search Report for PCT/KR2021/002335 mailed on Jun. 4, 2021 and its English translation from WIPO (published as WO2021/172876).

(Continued)

*Primary Examiner* — Raqiul A Choudhury
(74) *Attorney, Agent, or Firm* — Studebaker Brackett PLLC

(57) ABSTRACT

Provided are procedure approval method and system based on a virtual authentication code. The method is executed by a server, and includes receiving, by the server, a virtual authentication code and a request for procedure approval, searching for, by the server, a storage location of user authentication information of a user in a storage location search algorithm, based on the virtual authorization code, extracting, by the server, user authentication information stored in the storage location and authenticating the user based on the user authentication information, and approving the procedure when the user authentication is finished.

9 Claims, 7 Drawing Sheets

(56) References Cited

U.S. PATENT DOCUMENTS

| | | | |
|---|---|---|---|
| 9,911,255 B2 | 3/2018 | Lee | |
| 2007/0056022 A1* | 3/2007 | Dvir | H04L 63/08 726/4 |
| 2008/0115198 A1* | 5/2008 | Hsu | G06F 21/31 713/182 |
| 2008/0278325 A1* | 11/2008 | Zimman | G06F 21/35 340/572.1 |
| 2014/0040133 A1 | 2/2014 | Lee et al. | |
| 2015/0095968 A1* | 4/2015 | Steiner | G06F 21/62 726/1 |
| 2016/0217467 A1 | 7/2016 | Smets et al. | |
| 2017/0186251 A1 | 6/2017 | Lee | |
| 2018/0097789 A1* | 4/2018 | Murthy | H04L 63/0227 |
| 2019/0050849 A1 | 2/2019 | Yoo | |
| 2019/0050933 A1 | 2/2019 | Yoo | |
| 2019/0386981 A1* | 12/2019 | Ramesh Kumar | H04L 9/3228 |
| 2020/0051070 A1 | 2/2020 | Yoo | |
| 2020/0133215 A1 | 4/2020 | Yoo | |
| 2020/0134610 A1 | 4/2020 | Yoo | |
| 2020/0202329 A1 | 6/2020 | Yoo | |
| 2020/0320526 A1 | 10/2020 | Yoo | |
| 2020/0342445 A1 | 10/2020 | Yoo | |
| 2021/0157931 A1 | 5/2021 | Yoo | |
| 2021/0185034 A1 | 6/2021 | Yoo | |

FOREIGN PATENT DOCUMENTS

| | | |
|---|---|---|
| KR | 10-1316466 B1 | 10/2013 |
| KR | 10-2014-0017264 | 2/2014 |
| KR | 10-2014-0127987 | 11/2014 |
| KR | 10-2015-0105831 | 9/2015 |
| KR | 10-2017-0077328 | 7/2017 |
| KR | 10-2017-0111942 | 10/2017 |
| KR | 10-1804845 | 12/2017 |
| KR | 10-2019-0016884 | 2/2019 |
| KR | 10-2020-0018228 | 2/2020 |
| KR | 10-2079667 | 2/2020 |
| KR | 10-2131206 | 8/2020 |
| WO | 2017/056309 A1 | 4/2017 |
| WO | 2017/109413 A1 | 6/2017 |
| WO | 2020/032321 A1 | 2/2020 |

OTHER PUBLICATIONS

Written Opinion of the International Searching Authority for PCT/KR2021/002335 mailed on Jun. 4, 2021 and its English translation by Google Translate (published as WO2021/172876).

Office Action dated Jun. 16, 2022 for Korean Patent Application No. 10-2021-0025001 and its English translation from Global Dossier.

The extended European search report issued by the European Patent Office on Oct. 10, 2023, which corresponds to European Patent Application No. 21760382.8-1213 and is related to U.S. Appl. No. 17/801,770.

An Office Action mailed the Intellectual Property Office of Singapore on Jun. 24, 2024, which corresponds to Singaporean Patent Application No. 11202252386T and is related to U.S. Appl. No. 17/801,770.

An Office Action; "Notice of Reasons for Refusal," mailed by the Japanese Patent Office on Aug. 15, 2023, which corresponds to Japanese Patent Application No. 2022-550804 and is related to U.S. Appl. No. 17/801,770.

* cited by examiner

DEVICE AND METHOD FOR VIRTUAL AUTHENTICATION CODE-BASED PROCESS AUTHORIZATION

CROSS-REFERENCE TO RELATED APPLICATIONS

The present application is the U.S. National Phase of PCT Application No. PCT/KR2021/002335 filed on Feb. 24, 2021, which claims the priority to Korean Patent Application No. 10-2020-0022023 filed with the Korean Intellectual Property Office on Feb. 24, 2020 and Korean Patent Application No, 10-2021-0025001 filed with the Korean Intellectual Property Office on Feb. 24, 2021, the entire contents of which are incorporated herein by reference.

TECHNICAL FIELD

The present disclosure relates to an apparatus and method for approving a procedure based on a virtual authentication code, and in particular, to a method and apparatus for approving a procedure requested by a user, by generating a virtual authentication code that is generated so as not to duplicate according to each time point of each user and authenticating the user based on the virtual authorization code.

BACKGROUND ART

A one-time password (OTP) is a method of authenticating a user by using a one-time password made of randomly generated numbers. The OTP authentication method is a system introduced to improve security. Because user authentication is performed by generating the one-time password each time a user logs in, security vulnerabilities caused by the repeated use of the same password may be overcome.

However, in the existing OTP authentication method, at start, the user is identified through logging in by inputting a password, etc., and then an OTP is generated by using an OTP function assigned to the corresponding user, so that the authentication is completed through the generated OTP. There is an inconvenience in that the user has to log in every time OTP authentication is performed. Accordingly, there is a need for a method capable of performing user authentication by generating an OTP without logging in whenever the user requests authentication.

Meanwhile, from Jan. 1, 2020, a corporation may open an account of the corporation in a non face-to-face basis through a deputy such as an executive or an employee of the corporation. That is, each financial company may approve opening of an account for the corresponding corporation, when a corporation customer undergoes a non face-to-face verification process through a deputy. However, there are inconvenience and security vulnerabilities in the above new policy. A representative of the corporation has to assign a legal seal and document to the deputy. Therefore, there is a concern about illegal use, such as illegal use of name, and when the deputy forges the signature of the representative or illegally uses the name of the representative, it is difficult to identify the forgery due to the procedures.

Thus, it is demanded to create identification information for identifying the representative and the deputy who has been authorized to use the corporation account, and based on the identification information, to process financial procedure after identifying each representative and deputy. In particular, it may be desirable that the identification information is provided in a virtual code in order to prevent leakage to a third party. Also, a lot of financial transactions are currently made through computers and mobile terminals, and when the authorization process has to be repeatedly performed for each financial transaction, the user may feel fatigue to use a corresponding program or application. Therefore, there is a need for a method of simply performing user authentication only with one piece of identification information generated based on user information.

In addition, the above necessity for the method is not limited to the above financial transactions. When a procedure requiring approval of a supervisor is performed in a certain company or institution, the approval or authorization of the corresponding procedure may be requested through a virtual code that may verify the corresponding supervisor.

However, an appropriate authentication method for processing various financial transaction and financial procedures, as well as the above-described corporation account opening, in particular, an appropriate authentication method through a virtual code, has not been suggested yet.

DESCRIPTION OF EMBODIMENTS

Technical Problem

The present disclosure provides an apparatus and method for approving a procedure based on a virtual authentication code.

It will be appreciated by one of ordinary skill in the art that the objectives and effects that could be achieved with the present disclosure are not limited to what has been particularly described above and other objectives of the present disclosure will be more clearly understood from the following detailed description.

Solution to Problem

According to an aspect of the present disclosure, provided is a method of approving a procedure based on a virtual authentication code, performed by a procedure approval server (hereinafter, "server"), the method including receiving, by the server, a virtual authentication code and a request for procedure approval, the virtual authentication code being generated by a virtual authentication code generating function in a user terminal, searching for, by the server, a storage location of user authentication information of a user in a storage location search algorithm, based on the virtual authorization code, extracting, by the server, user authentication information stored in the storage location and authenticating the user based on the user authentication information, and approving the procedure when the user authentication is finished, wherein the procedure includes a plurality of types of procedures, an identification code corresponding to each procedure is preset to each of the plurality of procedure types, and the virtual authentication code is set at a specific time interval based on the user authentication information and the identification code, and is changed at every unit count that is changed over the time interval, and the approving of the procedure includes approving only the procedure corresponding to the identification code.

Alternatively, the virtual authentication code may be generated by combining a first code with a second code included in a plurality of detailed codes according to a specific rule, the first code and the second code may have a correlation, and the first code may determine a search start point with respect to the storage location in the server and the second code determines a search path with respect to the storage location from the search start point.

Alternatively, validity time data of the virtual authentication code may be set through the user terminal, a third code included in the plurality of detailed codes may be further generated based on the validity time data, and the virtual authentication code may be generated by combining the first code, the second code, and the third code according to a specific rule.

Alternatively, the virtual authentication code may include a virtual security code that is generated based on time data regarding a time when the virtual authentication code is generated or time data regarding a time when the procedure approval is requested by the user terminal, and the server may further verify the virtual authentication code based on the virtual security code.

Alternatively, the virtual authentication code may be generated based on one of card data provided to the user terminal and biometric data provided to the user terminal.

Alternatively, the virtual authentication code according to a first type procedure from among the plurality of procedure types may include a first virtual authentication code and a second virtual authorization code, the first virtual authentication code may be generated by first virtual authentication code generating function in a first user terminal based on first user information, the second virtual authentication code may be generated by a second virtual authentication code generating function in a second user terminal based on second user information, the receiving of the procedure approval request may include receiving a request for approval of the first type procedure by receiving the first virtual authentication code and the second virtual authorization code, and the approving of the procedure may be carried out only when identification codes of the first virtual authentication code and the second virtual authentication code are the same as each other.

Alternatively, the searching may include searching for a first storage location in which first user authentication information of a first user is stored in the storage location search algorithm based on the first virtual authentication code and searching for a second storage location in which second user authentication information of a second user is stored in the storage location search algorithm based on the second virtual authorization code, and the first storage location and the second storage location may be set so as not to overlap each other according to the unit count.

Alternatively, the method may further include receiving, by the server, second user information related to the first type procedure from the first user terminal, wherein the first virtual authentication code may be generated based on the second user information provided from the first user terminal, and the authenticating of the user may include authenticating the second user with respect to the first type procedure by comparing the second user information provided from the first user terminal with the second user authentication information extracted from the second storage location that is searched based on the second virtual authorization code.

According to another aspect of the present disclosure, provided is an apparatus for approving a procedure based on a virtual authentication code, the apparatus including a communicator configured to receive a request for procedure approval by receiving a virtual authorization code, a detailed code extractor configured to extract one or more detailed codes included in the virtual authorization code, a storage location search unit configured to search for a storage location in which user authentication information is registered in a storage location search algorithm based on the extracted one or more detailed codes, a user verification unit configured to authenticate a user by extracting the user authentication information, and a procedure approval unit configured to approve the procedure when the user authentication is completed, wherein the procedure includes a plurality of types of procedures, identification codes corresponding respectively to a plurality of procedures are preset to the plurality of procedure types, the virtual authentication code is set at a specific time interval based on the identification codes and is changed at every unit count that is changed over the time interval.

Besides, any other method and system for implementing the present disclosure, and a computer-readable recording medium for recording a computer program for executing the method may be further provided.

Advantageous Effects of Disclosure

According to the present disclosure, various effects below may be obtained.

First, whenever a user requests user authentication for authorizing a procedure, the user may provide a virtual authentication code that is newly generated at a unit count interval without duplication.

Second, by comparing a point in time when a virtual authentication code that is newly generated by a virtual authentication code generating unit at a unit count interval is generated with a point in time when a virtual authentication code verification device receives the virtual authentication code, it may be identified whether the virtual authentication code generated by the virtual authentication code generating unit is generated at a current point. That is, it may be determined whether the user requests user authorization for approving financial transaction by using the virtual authentication code that is currently generated.

Third, a server extracts user information stored in the server by using the virtual authorization code, and thus, a user who requests user authentication may be identified without logging in during the user authentication request.

Fourth, because the virtual authentication code is newly generated at every unit count, overlapping virtual authentication code does not occur during entire cycles, or because the server sets randomly an order of generating the virtual authorization code, from which user information may be extracted, the user information does not leak even when the virtual authentication code leaks.

Fifth, a virtual authentication code generating device for generating the virtual authentication code (e.g., user terminal) stores a virtual authentication code generating function, and an algorithm for verifying the virtual authentication code is only added to a virtual authentication code verification device (e.g., a server, etc.) that extracts user information by using the virtual authentication code and verifies whether the virtual authentication code is a normal code, and thus, leakage of the algorithm of generating and verifying the virtual authentication code may be prevented.

Sixth, according to the present disclosure, an algorithm for generating the virtual authentication code and searching for authentication information of a user is only added, and thus, an existing process may be used. As such, parts to be changed in the existing process in order to improve security may be reduced, and the user may not additionally perform a procedure for improving security.

The effects of the present disclosure are not limited to the aforementioned effects, and other effects of the present disclosure may be understood by the following description and will become apparent from the embodiments of the present disclosure.

MODE OF DISCLOSURE

Figure 1:
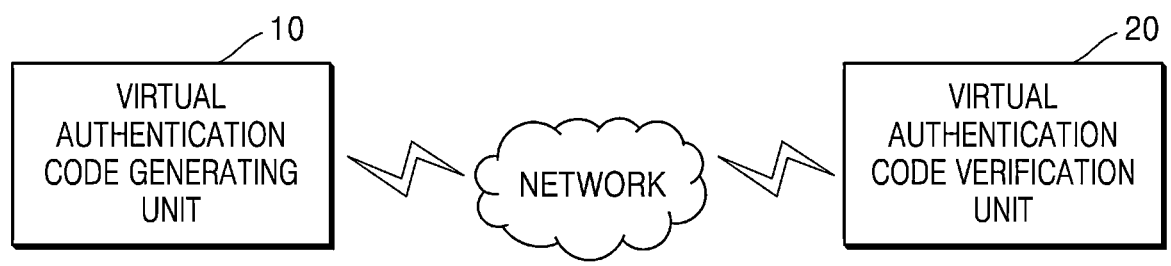
FIG. 1 is a block diagram of a procedure approval system using a virtual authentication code according to an embodiment of the present disclosure.

The attached drawings illustrate one or more embodiments and are referred to in order to gain a sufficient understanding, the merits thereof, and the objectives accomplished by the implementation. However, the present disclosure is not limited to the embodiments set forth below, and may be embodied in various other forms. The embodiments are for rendering the description of the present disclosure complete and are set forth to provide a complete understanding of the scope of the disclosure to one of ordinary skill in the art to which the present disclosure pertains.

The terms used in the present specification are merely used to describe particular embodiments, and are not intended to limit the present disclosure. An expression used in the singular encompasses the expression of the plural, unless it has a clearly different meaning in the context. It will be further understood that the terms "comprise" and/or "comprising" when used in this specification, specify the presence of stated elements, but do not preclude the presence or addition of one or more other elements. Throughout the present specification, same reference numeral denotes like element, and the term "and/or" includes any combination or any of a plurality of mentioned elements. Expressions including ordinal numbers such as "first" and "second" indicate various elements, but the above expressions do not limit the elements. These elements are used merely for the purpose to distinguish one element from the others. Thus, within the subject matter the present invention, a first element may be referred to as a second element.

Unless otherwise defined, all terms (including technical and scientific terms) used herein have the same meanings as commonly understood by one of ordinary skill in the art to which the present disclosure belongs. It will be further understood that terms defined in commonly used dictionaries should not be interpreted in an idealized or excessive sense unless expressly and specifically defined.

In this specification, 'user authentication' refers to a procedure for authorizing a user to pass through an area requiring security, such as access, login, or financial transactions, or to perform a function of a specific object.

In this specification, a 'financial transaction' refers to a procedure made with a financial company. The 'financial transaction' includes card payments, deposits or withdrawals from a bank account, opening of an account, etc.

In this specification, a 'character' is a component constituting a code and includes all or at least one of uppercase alphabet characters, lowercase alphabet characters, numerals, and special characters.

In this specification, a 'code' refers to a string of characters.

In this specification, a 'virtual authorization code' refers to a number generated by a virtual card number generating unit based on information provided by a user, and denotes a code used to search for user authentication information in a virtual card number verifying unit. That is, a 'virtual authorization code' refers to a virtual code temporarily assigned for each unit count to search for and extract the authentication information and verify user.

In this specification, a 'detailed code' refers to a part of codes included in the virtual card number.

In this specification, the 'unit count' refers to a unit that is set to a specific time interval and defined to be changed over a time interval. For example, 1 count may be used after being set to a specific time interval (e.g., 1.5 seconds).

In this specification, a 'virtual authentication code generating function' refers to a function used to generate a virtual authorization code.

In this specification, a 'rolling movement' means that an object performs both rotational and translational movements. That is, the 'rolling movement' denotes moving while performing both rotational and translational movements, and that each point of an object rotating moves in contact with a moving axis sequentially.

In this specification, a 'storage location' refers to a point (count) on a track corresponding to a point in time when the registration of user authentication information is requested by a user or when user information is initially received by a server from a virtual authentication code generating unit.

Hereinafter, one or more embodiments will be described in detail with reference to accompanying drawings.

FIG. 1 is a block diagram of a procedure approval system using a virtual authentication code according to an embodiment of the present disclosure.

As shown in FIG. 1, a procedure approval system using a virtual authentication code includes a virtual authentication code generating unit 10 and a virtual authentication code verification unit 20.

In this specification, 'authority' denotes a right or qualification required for approving a procedure requested by a user in a specific field, a specific procedure, or transaction. Authorization is made through user authentication based on a virtual authentication code in the corresponding field.

In addition, 'procedure approval request' of a user is a request for approval of a specific procedure in a specific technical field and industrial field related to the user. For example, the 'procedure approval request' may correspond to requesting a server of a financial institution to approve each financial transaction, such as login, account transfer, deposits or withdrawals, etc. through an application or program provided in the financial transaction field. Moreover, the 'procedure approval request' may be made offline. For example, when a user designates a virtual authentication code on a document and submits the document to a financial institution on visiting the financial institution, an employee of the financial institution may request the server of the financial institution to approve the procedure with respect to a financial transaction corresponding to the authentication of the user and the document and finally request the procedure approval.

Moreover, one of ordinary skill in the art would be appreciate that the 'procedure approval request' is not limited to the financial transaction. For example, 'user verification' and 'authorization verification' that are necessary for approving a certain procedure may be requested during business procedures in a company or an institution.

In the present specification, the 'financial transaction' is described as an example regarding the 'procedure approval' in order to help the understanding of the disclosure. However, this is a configuration of restricting the present disclosure.

A virtual authentication code generating unit 10 denotes a device on which a dedicated program or a dedicated application (hereinafter, referred to as a dedicated program) for generating a virtual authentication code based on user information is installed. The virtual authentication code generating unit 10 generates a virtual authentication code including information for allowing the virtual authentication code verification unit 20 that will be described later to search for authentication information of the user. In more detail, the virtual authentication code is generated based on the user information according to a virtual authentication code generating function.

Hereinafter, for the understanding of the present disclosure, the virtual authentication code generating unit 10 is described below as a user terminal 100.

The virtual authentication code verification unit 20 searches for a storage location in which authentication information of the user is registered in the virtual authentication code verification unit 20 and extracts the user authentication information stored in the corresponding location, based on the virtual authentication code generated by the virtual authentication code generating unit 10. In addition, the authentication of the user who has requested for the financial transaction approval is performed based on the extracted user authentication information.

Also, the virtual authentication code verification unit 20 verifies whether the virtual authentication code is normally generated code, based on a point in time of receiving the virtual authentication code and a point in time of generating the virtual authentication code in the virtual authentication code generating unit 20, that is, the user terminal 100. The virtual authentication code verification unit 20 may store a virtual authentication code generating function that is the same as the virtual authentication code generating unit 10, in order to search for the user authentication information from the virtual authentication code received from the virtual authentication code generating unit 10. In addition, a method of performing the user authentication by verifying the virtual authentication code is described later in detail. Hereinafter, for understanding of the present disclosure, the virtual authentication code verification unit 20 is described below as a financial transaction payment server 200 (hereinafter, referred to as server).

In an embodiment of the present disclosure, a virtual authentication code dedicated program is provided from the user with user data for generating the virtual authorization code.

Here, in an embodiment of the present disclosure, the virtual authentication code dedicated program may denote a dedicated program or a dedicated application provided from a specific financial company server. Alternatively, the virtual authentication code dedicated program may denote a dedicated program or dedicated application that is necessary for performing a certain procedure. For example, the user may register user information to a certain financial company server through the dedicated program or the dedicated application provided from the financial company.

For example, when user information (social identification number, mobile phone number, etc.) provided to the dedicated program for signing up is provided to the financial company server through the corresponding program or application, the financial company server may store the user information in a certain count.

In addition, in an embodiment of the present disclosure, the user information may include biometric information of the user. For example, face information, fingerprint information, etc. of the user may be included in the biometric information. The biometric information may be registered in the financial company server 20 along with other user information of the user during the process of signing up of the user, but may be separately registered during an additional setting process of a user authentication unit. When registering the information through the additional setting process, the biometric information is stored at the same count as that of the other user information stored in advance.

In addition, in another embodiment of the present disclosure, the user information may denote user's card data registered in the corresponding financial company server 200. For example, when the user tags a card issued by a specific financial company on a user terminal, card data stored in an IC chip of the corresponding card is sent to the user terminal 100. Here, the user terminal 100 generates the virtual authentication code based on the card data. This is not limited to the financial company server, and may be made through a user card that is issued by a specific company, corporation, and institution and has corresponding data registered in the server.

In an embodiment of the present disclosure, the dedicated program generates a virtual authentication code for user authentication by using user information provided by the user. The dedicated program includes a virtual authentication code generating function and generates the virtual authentication code by using all or some of certain user information from among a plurality of pieces of user information.

For example, the dedicated program may generate the virtual authentication code by using the card data provided from the user as seed data of the virtual authorization code. In addition, for example, the dedicated program may use a combination serial number obtained by combining the card data with the serial number of the dedicated program as seed data of the virtual authentication code generating function.

Also, in an embodiment, the dedicated program registers the user information in the server as described above. That is, the user registers the user information to the dedicated program built-in or installed in the user terminal 100, and the dedicated program transmits and registers the user information to the server 200.

In detail, the dedicated program generates the user information by receiving the user information from the user or based on login information of the user to the dedicated program. After that, the dedicated program transmits the user information to the server 200.

As the server 200 registers the user information in a certain count, the dedicated program receives the virtual authentication code generating function or setting data for specifying the virtual authentication code generating function from the server 200. As such, the dedicated program may include the virtual authentication code generating function that generates the virtual authentication code allowing a certain count to which the user information is registered to be searched for in the server 200.

In addition, the server 200 stores user information provided from the dedicated program or user information stored in the server 200 in advance to a certain count according to the request from the dedicated program. In addition, at least one piece of user information in the user information described above is registered in the server 200, and the specific user information registered in the server is used to authenticate the user and described as user authentication information.

Figure 2:
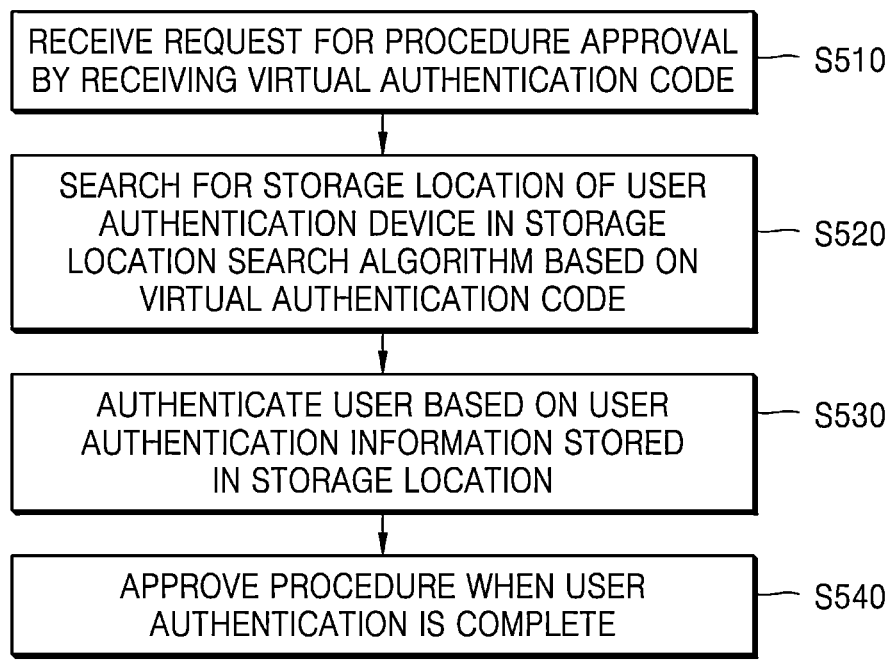
FIG. 2 is a flowchart schematically describing a method of approving a procedure based on a virtual authorization code, according to an embodiment of the present disclosure.
Figure 3:
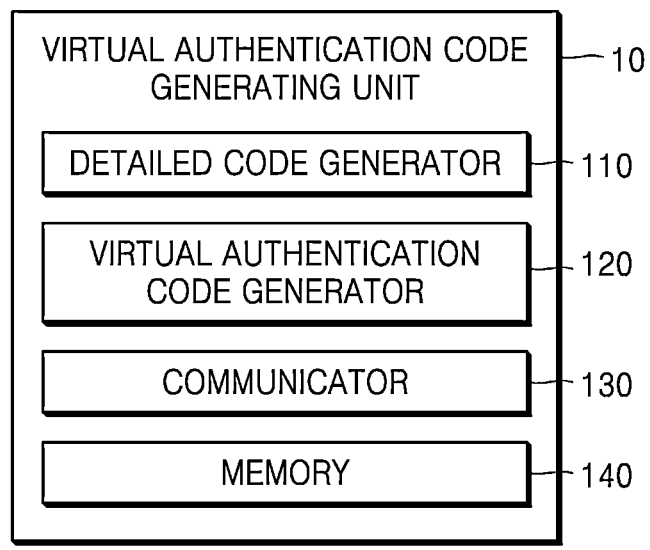
FIG. 3 is a block diagram of a virtual authentication code generating unit according to an embodiment of the present disclosure.

FIG. 2 is a flowchart schematically describing a method of approving a procedure based on a virtual authorization code, according to an embodiment of the present disclosure. FIG. 3 is a block diagram of a virtual authentication code generating unit according to an embodiment of the present disclosure.

Referring to FIG. 2, the financial transaction payment server 200 receives a virtual authentication code from the user terminal 100 and is requested to approve procedure.

Here, in an embodiment of the present disclosure, the virtual authentication code is generated by the virtual authentication code generating function in the user terminal 100, which is one example of the virtual authentication code generating unit 10. Hereinafter, referring to FIG. 3, the method of generating the virtual authentication code is described below.

Referring to FIG. 3, the virtual authentication code generating unit 10 includes a detailed code generator 110, a virtual authentication code generator 120, a communicator 130, and a memory 140.

The virtual authentication code generating unit 10 may include, in an embodiment, the user terminal 100 on which a program (i.e., application) for generating the virtual authentication code for user authentication is installed.

The detailed code generator 110 generates one or more detailed codes based on the user information. The virtual authentication code generating function includes one or more detailed code generating functions. For example, when the virtual authentication code includes a plurality of detailed codes, the virtual authentication code generating function generates the plurality of detailed codes by using the plurality of detailed code generating functions and generates the virtual authentication code by using a detailed code combination function that combines the plurality of detailed codes.

Here, the virtual authentication code is generated at every unit count by a dedicated program built-in or installed in the virtual authentication code generating unit 10, that is, the user terminal 100, and may correspond to a mobile one time password (mOTP).

In an embodiment of the present disclosure, the virtual authentication code generating unit 10 may use a social identification number as one of seed data for the virtual authentication code generating function. In more detail, the detailed code generator 110 generates each detailed code by using a combination serial number as seed data of the detailed code generating function, wherein the combination serial number is obtained by combining the social identification number stored in the memory 140 and the serial number of the dedicated program built-in or installed in the virtual authentication code generating device 100 by using one detailed code generating function. Here, the detailed code generator 110 may generate each detailed code by using a point in time of receiving request for user authentication from the user or a count value as well.

For example, the virtual authentication code generating unit 10 may not store the user information in the memory (not shown), but may be provided from the user whenever the virtual authentication code is generated. For example, the virtual authentication code based on the card data as described above may correspond to the example. In order to generate the virtual authorization code, the virtual authentication code generating unit 10 requests the user for the card data. In addition, the virtual authentication code is generated based on the card data input by the user.

In an embodiment, the detailed code generator 110 may include a first function and a second function as the detailed code generating functions and may generate a first code and a second code. Here, the virtual authentication code generating unit 10 may include the first function generating the first code and the second function generating the second code as the detailed code generating functions in order to improve security, but may not include data about a correlation between the first code and the second code.

The virtual authentication code generator 120 may generate the virtual authentication code by combining one or more detailed codes by using the virtual authentication code generating function. In an embodiment, the virtual authentication code may be generated by combining the plurality of detailed codes according to a certain rule. The virtual authentication code generating function includes a rule for combining the plurality of detailed codes (e.g., detailed code combining function). That is, the virtual authentication code generator 120 may combine the one or more detailed codes by using the detailed code combination function included in the virtual authentication code generating function.

One virtual authentication code may be generated by combining the plurality of detailed codes by various methods. In an example of the detailed code combination function, the virtual authentication code generator 220 may generate the virtual authentication code by alternately arranging the first code of N digits and the second code of N digits. Also, in another example, the detailed code combination function may be a function of combining the second code behind the first code. As the detailed codes included in the virtual authentication code increase, the detailed code generating function may be variously generated.

Also, in an embodiment, when the virtual authentication code is generated as a combination of the first code and the second code according to a specific rule, the first code and the second code may perform their own functions in order to search for the storage location of the user authentication information in the storage location search algorithm in which the user information is stored. For example, the first code sets a point of starting the search of the storage location and the second code sets a searching path from the starting point to the storage location of the user authentication information according to a specific search method. That is, when the virtual authentication code that is normally generated for each unit count is provided from the virtual authentication code generating unit 10, the virtual authentication code verification unit 20 determines a point moved from the search starting point corresponding to the first code along the search path corresponding to the second code, included in the virtual authorization code, as a point where the user information is stored (i.e., the storage location of the user authentication information). A detailed method of searching for the storage location of the user authentication information based on the first code and the second code constituting the virtual authentication code is described later.

In an embodiment of a method of generating the detailed code by the detailed code generator 110, the detailed code generator 110 generates new detailed code for every unit count, and accordingly, the virtual authentication code generating unit 10 generates a new virtual authentication code for every unit count. The virtual authentication code that is newly generated for each unit count is not duplicated. In detail, the detailed code generator 110 may be set so that the virtual authentication code newly generated for each unit count is not duplicated for a period set by a certain user or a certain virtual authentication code generating unit 10, and also is not duplicated between users included in a certain group.

In an embodiment for preventing the duplication of the virtual authorization code, when the first code and the second code of N digits are generated by using M characters, the detailed code generating function included in the virtual authentication code generating function may generate $M^N$ codes as the first and second codes, and match each code with each count from the initial point in time where the detailed code generating function is driven. For example, when the unit count is set as 1 sec., different $M^N$ codes are each matched with each second from the time point when the detailed code generating function is initially driven. In addition, when a period of using a certain detailed code generating function or a period of using the virtual authentication code generating unit (10) (for example, a valid period of the user terminal on which the application for generating the virtual authentication code is installed) is set to be a time shorter than a time corresponding to $M^N$ count (for example, when one count is one sec., $M^N$ sec.), the same first code and second code are not repeatedly generated during the usage period. That is, when the count increases as time elapses, and when the user accesses the user authentication information at a certain point in time and requests the virtual authentication code generating unit 10 to generate the virtual authorization code, virtual authentication code generating unit 10 may generate a code value matching to a count corresponding to the certain point in time as the first code and the second code.

In detail, uppercase letters and numbers 0 to 9 are used as characters that may be included in the code (that is, 36 characters) and six digits are assigned to each of the first code and the second code, the virtual authentication code generating unit 10 may provide $36^6$ codes as the first and second codes. Here, the virtual authentication code generating unit 10 matches each code to each count, and changed first and second codes may be provided to each count.

In another detailed embodiment in which duplication of the virtual authentication code is prevented, when the usage cycle of the virtual authentication code generating unit 10 has passed, the function of generating the first code and the second code (that is, the first function or the second function) is changed, or a matching relationship of the first code and the second code is changed so as to generate the virtual authentication code that is different from that of the previous usage cycle. In case where the virtual authentication code is generated by combining the first code generated by the first function and the second code generated by the second function, when the first code generating function or the second code generating function is changed, the virtual authentication code generating unit 10 may apply a virtual authentication code generating function that generates the virtual authentication code different from that of the previous cycle to a new usage cycle because the order of appearance of the first code or the second code is changed from that of the previous usage cycle. Also, the virtual authentication code generating unit 10 may select the first function and the second function so that the same code as the virtual authentication code used in the previous usage cycle does not appear as the virtual authentication code in each count within the new usage cycle (that is, the matching relation between the first code generated according to the first function and the second code generated according to the second function may not be included in the matching relation included in the previous usage cycle for every count in the new usage cycle). That is, after the usage cycle in which each of the $M^N$ codes may be applied once has elapsed, the virtual authentication code generating function that does not generate the virtual authentication code overlapping those of the previous usage cycle may be applied to the new usage cycle through adjusting or updating the virtual authentication code generating function.

Also, in another detailed embodiment in which the duplication of the virtual authentication code is prevented, so as not to generate the duplicate virtual authentication code without regard to the user in all the cycles, the first code may be set as a code value corresponding to a point in time (or count) when the generation of the virtual authentication code is requested, from among the codes matching to respective counts from the initial point in time of driving the first function, and the second code may be set as a code value generated by reflecting a value that is always different at the same point in time for each piece of user authentication information (i.e., a social identification number, a cell phone number, a set password, etc. of the user), and the virtual authentication code may be used as the code value combining the first code with the second code. The first code varies at each count and the second code has a code value varying depending on the virtual authentication code generating unit 10 at the same point in time, and thus, the virtual authentication code combining the first code with the second code has a code value varying depending on each user and each point in time.

Also, in another embodiment, one of a plurality of arrangement rules that arranges M characters in an ascending order is applied to the virtual authentication code generating function (or detailed code generating function). That is, the virtual authentication code generating unit 10 may variously apply a rule of arranging M characters in an ascending order to the detailed code generating function included in the virtual authentication code generating function. For example, the arrangement rule of arranging uppercase letters in an ascending order may be in an order of A, B, C, . . . , and Z or A, C, B, . . . , and Z. When the arrangement rule is changed in the virtual authentication code generating function, an order of matching codes sequentially and respectively to the counts from the initial point in time of driving the virtual authentication code generating function is changed.

Also, in an embodiment of the present disclosure, the virtual authentication code may further include a virtual security code. For example, the virtual authentication code includes a plurality of detailed codes and a virtual security code. The security code of the virtual authentication code is used to verify whether the virtual authentication code is a normal virtual authorization code. To this end, although not shown in the drawings, the virtual authentication code generating unit may further include a security code generating function. Here, the security code generating function generates a security code of a specific digit by using time data and user information as function values. The time data may denote a point in time when the user authentication and financial transaction approval are requested from the user terminal. However, one or more embodiments are not limited thereto. In addition, a method of verifying the virtual authentication code based on the virtual security code is described in detail later.

In an embodiment of the present disclosure, the virtual authentication code generating unit 10 may set a time stamp of the generated virtual authorization code. That is, a validity time in which the generated virtual authentication code is used for the user authentication is set. Here, the validity time data of the virtual authentication code may be set differently according to the financial transaction type described above.

In addition, in an embodiment of the present disclosure, the virtual authentication code generating unit 10 may further include a third detailed code generating function, and a third detailed code may be generated by applying the validity time data to the third detailed code generating function. Here, the first detailed code, the second detailed code, and the third detailed code are combined by a detailed code combination function according to a specific rule. Here, the virtual authentication code verification unit 20 may extract the third detailed code with respect to the validity time data by applying the received virtual authentication code to the detailed code combination function. In addition, it is determined whether the point in time when the virtual authentication code is received from the user terminal 100, that is, the virtual authentication code generating unit 10, (a time point when the financial transaction approval is requested) is within the validity time data. When the time point when the virtual authentication code is received is out of the validity time data, the financial transaction requested by the user terminal 100 is not approved. As such, repeated re-use of the virtual authentication code is prevented to improve security, and even when the virtual authentication code is exposed to a third party, the use of the corresponding virtual authentication code may be prevented.

The virtual authentication code provider 130 provides the generated virtual authentication code to the virtual authentication code verification unit 20 to request for user authentication. More accurately, the virtual authentication code may be sent to the server 200 to request for an approval of a specific financial transaction.

In addition, although not shown in the drawings, the virtual authentication code provider 130 may include all or some of a wireless Internet module, a short-range communication module, an integrated circuit (IC) chip, a magnetic field generator, and a display unit.

The wireless internet module is a module for accessing wireless Internet, and may be built in or out of the mobile terminal 100. As wireless Internet technology, wireless LAN (WLAN), Wi-Fi, wireless broadband (Wibro), world interoperability for microwave access (Wimax), high speed downlink packet access (HSDPA), long term evolution (LTE), LTE-advanced (LTE-A), etc. may be used. For example, in an example in which the virtual authentication code generating unit 10 is a mobile terminal on which an app-card application is installed, when an item is purchased through a shopping application or a shopping web-site, the virtual authentication code generating unit 10 may send the virtual authentication code to the financial payment server 20 through a payment service server (e.g., a PG-company server) in wireless internet communication.

The short range communication module denotes a module for performing near field communication. Short range communication technology may include Bluetooth, Bluetooth low energy (BLE), Beacon, radio frequency identification (RFID), near field communication (NFC), infrared data association (IrDA), ultra wideband (UWB), ZigBee, etc.

The display unit (not shown) may include at least one of a liquid crystal display, a thin film transistor-liquid crystal display, an organic light-emitting diode display, a flexible display, E-paper, etc.

In an embodiment of the present disclosure, the virtual authentication code provider 130 outputs the virtual authentication code to the outside. For example, when the user wants to perform user authentication when paying based on the virtual authorization code, the virtual authentication code is output to the display unit (not shown) so that the user may visually identify the virtual authentication code or copy and paste the virtual authentication code to another program or a webpage. That is, the user may copy the virtual authentication code output on a screen of the user terminal 100 and paste the virtual authentication code to the program or webpage so as to provide the financial company server 200 with the virtual authorization code.

The display unit visually outputs the virtual authentication code generated by the virtual authentication code generator 120.

Figure 4:
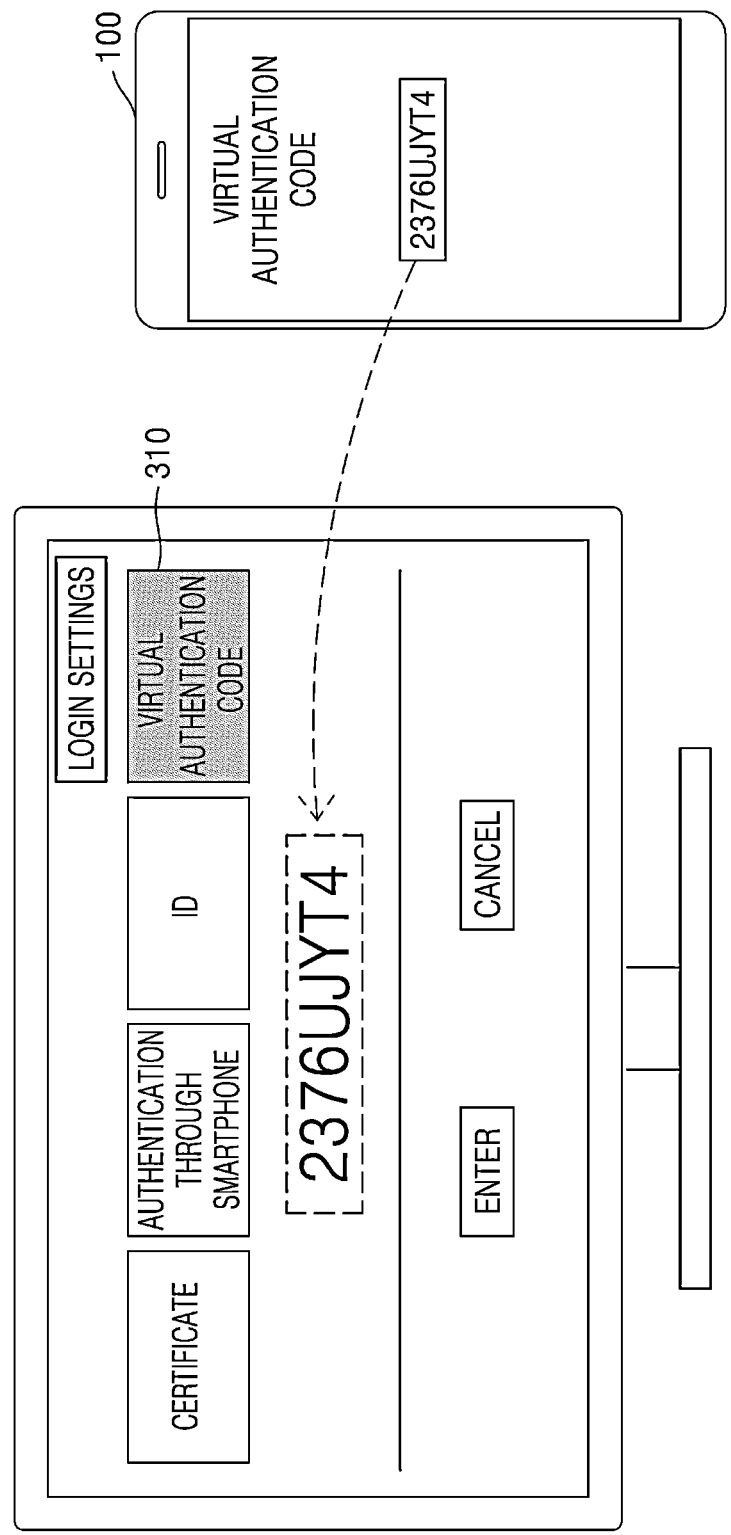
FIG. 4 is a diagram showing an example of performing a financial transaction based on a virtual authentication code according to an embodiment of the present disclosure.

FIG. 4 is a diagram showing an example of performing a financial transaction based on a virtual authentication code according to an embodiment of the present disclosure.

Referring to FIG. 4, the user executes a program of a corresponding financial institution by using a device rather than the user terminal 100, that is, the virtual authentication code generating unit 10. Here, the user may request for approval of a login procedure based on a virtual authentication code 310 as an authorization unit for login, in addition to a public certificate, user identification (UID), and password that are existing authorization units. The user may input the virtual authentication code generated by the user terminal 100 and displayed on the display unit to the device and may request the server 200 for login approval.

The public certificate and the UID that is an existing authorization unit are set to have a restricted usage period. Therefore, when the usage period of the public certificate has elapsed, the updated public certificate has to be registered again and the UID of the user requests the user to regularly change the password. However, when the virtual authentication code is used, the virtual authentication code that is not duplicated may be generated without performing the regular update and changing operations.

The virtual authentication code may be used in various financial transactions. For example, the user may carry out a transfer transaction to a third party account while executing a program of a certain bank through the user terminal 100. Here, the server 200 may request the user for the user authentication procedure, and the user may input the virtual authentication code generated by the user terminal 100 and request for the transfer transaction approval as described above. As such, the user may perform a rapid financial transaction based on one virtual authentication code that is generated by the user terminal 100, that is, the virtual authentication code generating unit 10, without performing repeated authentication processes.

In addition, in an embodiment of the present disclosure, an identification code of each procedure type may be set in advance. For example, the identification code for identifying each procedure may be set with respect to each of the procedures such as login, transfer, opening an account, etc.

Here, the virtual authentication code may be generated based on the identification code, according to an embodiment of the present disclosure. In detail, the virtual authentication code generator 120 may generate the virtual authentication code by using card data provided from the user or the identification code set through the user terminal with respect to the procedure type as source data. As such, the virtual authentication code generating unit 10 may generate the virtual authentication code that varies depending on the type of procedure, the user, and the time point of generating the virtual authorization code.

For example, in the case of a financial transaction, the identification codes may be aligned according to the types of procedure, such as a login process, an account transfer process, an account opening process, etc. Here, it is natural that the same identification code is assigned to the plurality of procedures.

Although not shown in the drawings, the procedure approval method by using the virtual authentication code according to an embodiment of the present disclosure may further include an operation of registering the user information in the server. As such, the server 200 may set the storage location of each user authentication information according to a count corresponding to the point in time when the user information is registered. Here, each storage location of the user authentication information is set so as not to overlap the others.

In addition, the user authentication information corresponds to the user information, and at least one piece of the user information input through the program is stored in the server 200. Here, at least one piece of user information that is stored may be used in the user authentication process.

The server 200 may carry out the registration of the user authentication information by searching for a certain user authentication information storage location in the storage location search algorithm based on the time point when the registration of user information is requested by the user, and by storing the user information requested to be registered (that is, information about the user having the user authentication information) at found user authentication information storage location.

Here, the user information may include information input directly by the user through the user terminal on which the virtual authentication code generation-dedicated program is built in or installed, or information generated based on the user login information of the virtual authentication code generation-dedicated program.

Figure 5:
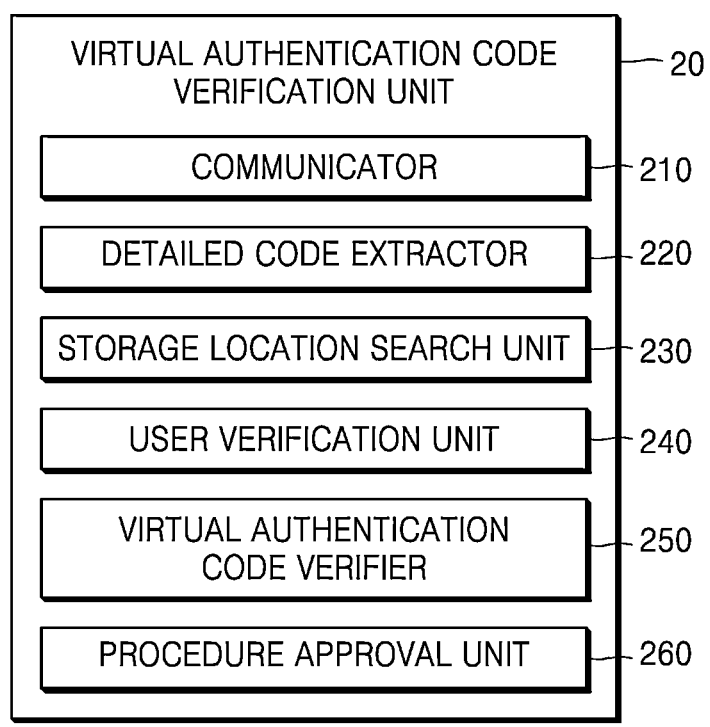
FIG. 5 is a block diagram of a virtual authentication code verifying device according to an embodiment of the present disclosure.

FIG. 5 is a block diagram of a virtual authentication code verifying device according to an embodiment of the present disclosure.

Referring back to FIG. 2, the server searches for the storage location of the user authentication information of the user in the storage location search algorithm, based on the virtual authentication code (S520).

In an embodiment of the present disclosure, although not explicitly shown in the drawings, the server 200 may carry out a process of verifying the virtual authentication code according to the procedure type, after identifying the type of procedure. It is because there may be a case in which a plurality of virtual authorization codes are necessary according to the type of procedure, or a case in which a time point when the procedure approval is requested based on the virtual authentication code has to be within a preset time period from the time point when the virtual authentication code is generated.

The storage location search algorithm matches the virtual authentication code generating function included in the dedicated program that is built in or installed on the virtual authentication code generating unit 10 (that is, user terminal), and searches for the storage location of the user authentication information based on at least one detailed code in the virtual authorization code. For example, when the virtual authentication code includes the first code determining the searching start point of the storage location and the second code indicating a direction of the storage location from the searching start point, the storage location search algorithm is an algorithm that adjusts so that the storage location where the time point of registering the user authentication information is matched is placed to a location indicated in the direction corresponding to the second code from the point corresponding to the first code.

According to the present disclosure, the storage location search algorithm matching the virtual authentication code generating function is used, the virtual authentication code verification unit 20 may search for the storage location of the user authentication information (that is, the user authentication information registration count) and extract user information stored in the corresponding storage location even when the first code and the second code included in the virtual authentication code are changed. Various schemes may be applied to the storage location search algorithm, and a detailed example is described later. However, the storage location search algorithm is not limited to the example described later.

Hereinafter, referring to FIGS. 2 and 5, the user authentication and the financial transaction approval methods of the virtual authentication code verification device 20 are described below.

As shown in FIG. 5, the virtual authentication code verification unit 20 includes a communicator 210, a detailed code extractor 220, a storage location searching unit 230, a user verification unit 240, a virtual authentication code verifier 250, and a procedure approval unit 260.

The communicator 210 receives the virtual authentication code from the user terminal 100 and receives a request for approval of a certain procedure along with the user authentication.

For example, in the case of the financial transaction, the approval of procedure for account transfer may be requested through the user terminal. Here, the communicator 210 may receive the request for the user authentication by receiving the virtual authentication code generated by the dedicated program built-in or installed on the user terminal.

The detailed code extractor 220 extracts one or more detailed codes included in the virtual authorization code.

In an embodiment, the detailed code extractor 220 includes a detailed code combining function included in the virtual authentication code generating function. Therefore, when the virtual authentication code includes a plurality of detailed codes, the detailed code extractor 220 may extract the plurality of detailed codes from the virtual authentication code by applying the detailed code combining function. For example, when the virtual authentication code generating unit 10 generates the virtual authentication code in which two detailed codes (that is, the first code and the second code) are combined, the detailed code extractor 220 may isolate the first code and the second code by applying the detailed code combining function to the character arrangement of the virtual authorization code.

The storage location searching unit 230 searches for the storage location to which the user authentication information is registered in the storage location search algorithm based on one or more extracted detailed codes. Various methods may be applied to search for the storage location of the user authentication information based on each detailed code in the storage location searching unit 230. In order for the storage location searching unit 230 to search for the storage location based on the plurality of detailed codes, the detailed codes may have a correlation.

Here, the storage location denotes a point (count) on a track corresponding to the time point when the registration of user information is requested through the dedicated program by the user, as described above. That is, when a track with respect to the corresponding user authentication information is driven in the server 200 and the registration of specific user information is requested by a certain user at a certain time point, the corresponding user authentication information is registered to a count corresponding to the time point (that is, counts elapsed from the final driving time of the track to the registration time point).

When the virtual authentication code includes the first code and the second code, the storage location search unit 230 determines the search start point corresponding to the first code and may find a point moved from the search start point according to the searching path corresponding to the second code as the storage location of the user authentication information. As the virtual authentication code generating unit 10 provides a new virtual authentication code for each unit count, the virtual authentication code verification unit 20 may set the search start point and the search path based on the first code and the second code that are changed at each point and search for the storage location of the user authentication information (that is, a location of registering the user authentication information).

The user verification unit 240 extracts the user authentication information stored in the storage location that is found by the storage location search unit 230 and finishes the user authentication. That is, because the virtual authentication code verification unit 20 stores the user authentication information of each user at a count corresponding to the time point when the user authentication information from each user is registered in the storage location search algorithm, the user verification unit 240 may extract certain user information that is matched to and stored in the storage location of the certain user authentication information in the storage location search algorithm. Accordingly, when the user authentication is performed, it may be identified who is requesting the user authentication without logging-in.

Figure 6:
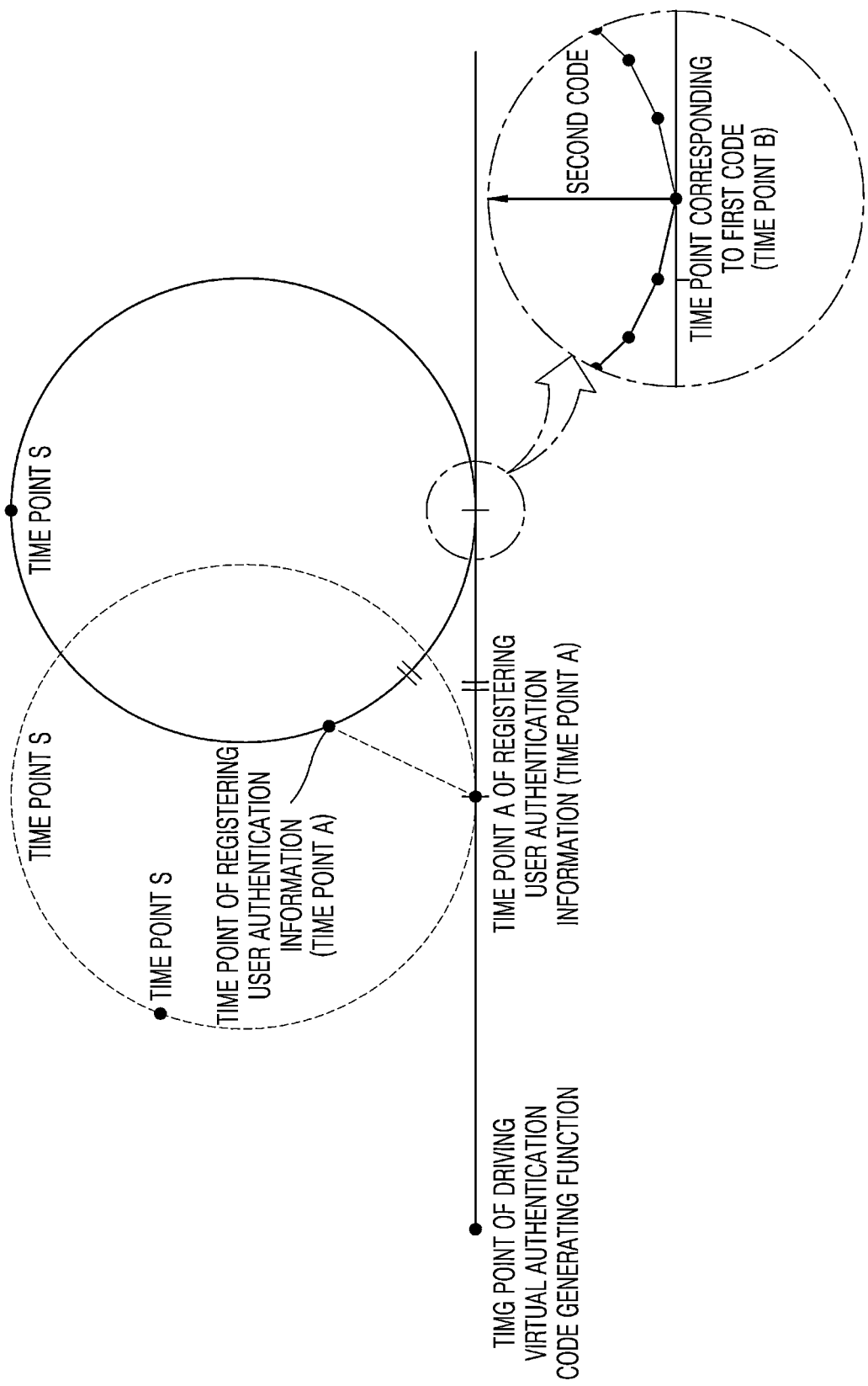
FIG. 6 is a diagram for describing a method of searching for a storage location of user authentication information by a storage location searching algorithm of a K-gon, according to an embodiment of the present disclosure.

FIG. 6 is a diagram for describing a method of searching for a storage location of user authentication information by a storage location searching algorithm of a K-gon, according to an embodiment of the present disclosure.

For example, referring to FIG. 6, when the storage location search algorithm is a k-gon (k is $M^N$) which performs rolling motion along a track in which $M^N$ codes corresponding to the first code are arranged and a vertex of the k-gon is moved while corresponding to a point where the code is arranged on a first code track, each vertex of the k-gon may be matched to the storage location of the user authentication information, and a point where the first code track (e.g., first track) corresponds to the k-gon may be a storage location search starting point corresponding to the first code. Here, the storage location searching unit 230 may apply the k-gon to rolling motion such that the vertex of the k-gon is in contact with the point corresponding to the first code extracted by the detailed code extractor 220. As such, as it is indicated at an angle corresponding to the second code from the location on the first track where the k-gon contacts (for example, a specific angle for dividing 180° into $M^N$) portions to face the vertex of the k-gon), the storage location searching unit 230 may search for a vertex of the k-gon, which is a storage location where the user authentication information corresponding to the virtual authentication code is stored.

In detail, as shown in FIG. 6, the virtual authentication code verification unit 20 may perform rolling motion of the k-gon to a point corresponding to the first code (that is, moving the k-gon so that each vertex of the k-gon sequentially comes into contact with each point on a track). After that, the virtual authentication code verification unit 20 indicates an angle direction corresponding to the second code and search for a vertex corresponding to the storage location.

Also, in another example, when the k-gon is in contact with a point corresponding to the first code on the first track, the server 200 may divide the entire central angle (that is, 360°) into $M^N$ angles about a contact point between the center of the k-gon and the first track and may match each angle to $M^N$ second codes. Here, a direction of a line moving a specific number of unit angles (that is, 360°/$M^N$) from a line connecting the center of the k-gon to the contact point on the first track may be a specific vertex of the k-gon. Therefore, when the second code corresponding to the specific angle is received, the server 200 may search for the vertex located in the corresponding angle direction.

Also, in another example, a specific digit of the second code may be used to determine an angle calculation direction. That is, when the second code is generated by using N characters (N is a natural number), an angle measurement direction may be determined as one digit. For example, when the entire central angle (that is, 360°) is divided on the basis of the center of the k-gon and the contact point on the first track and the second code is matched to each angle, the server 200 may determine whether an angle is an angle measured in a left direction or a right direction from the line connecting the center of the k-gon to the contact point on the first track as a value of one digit.

For example, the storage location search algorithm may arrange two different second codes to one vertex according to the angle measurement direction. That is, when reaching one vertex at an internal angle and at an external angle, different second codes may be matched, and a storage location of different user authentication information may be connected to the one vertex. In another example, when the second code is generated by using N (N is a natural number) characters, the storage location search algorithm may match the second code to half the entire angle (e.g., 360° when dividing with respect to the central angle) by using N−1 characters, and may determine an angle application direction for reaching each vertex by using one digit.

The method of searching for the storage location in the k-gon based on the second code is not limited thereto, and various methods such as a method of searching for a point where a point dividing the point on the k-gon corresponding to the second code and the contact point on the first track at a certain rate as a storage location may be applied.

According to another embodiment, when the virtual authentication code includes the first code and the second code that are changed at every unit count, the first code is generated based on the unit counts that have elapsed from the initial time point when the user authentication is performed based on the virtual authentication code in the server 200, and the second code is generated based on the unit counts that have elapsed from the time point when the user information is registered by each user through the dedicated program installed on the user terminal 100. Here, the unit counts are set to have specific time intervals therebetween and thus are changed according to passing of the time intervals.

In detail, as a certain financial institution drives a user authentication service based on the virtual authorization code, when the virtual authentication code includes the first code generated based on the unit counts passed from the initial time point when the storage location search algorithm starts and the second code generated based on the unit counts passed from the time point when the user information of each user is registered, as shown in FIG. 6, the server 200 sets the count on the track to which the code value corresponding to the first code is matched as the search start point, and searches for the point on the track at the time point when the user information is registered to the server 200 (that is, the storage location of the user authentication information) by recovering from the search start point along the track as much as the count value corresponding to the second code.

For example, the server sets the search start point by searching for the point (or count) to which the first code in the virtual authentication code is assigned in the first code track, and searches for the point (or count) to which the second code in the virtual authentication code is assigned by arranging the second code track in the reverse direction from the search start point, and then, extracts the point (or count) to which the user authentication information is registered on the first code track.

Also, for example, the server 200 sets the search start point based on the first code in the virtual authentication code and returns by a count value calculated as the inverse function of the second function is applied to the second code in the virtual authorization code, and then, searches for the point corresponding to the time point when the user authentication information is registered.

The virtual authentication code verifier 250 verifies the virtual authentication code by comparing the time point when the communicator 210 receives the virtual authentication code and the time point when the virtual authentication code is generated by using the virtual authentication code generating function in the virtual authentication code generating unit (that is, the user terminal).

In an embodiment, the virtual authentication code verifier 250 compares the time point of receiving the virtual authentication code with the time point when the dedicated program built-in or installed on the user terminal generates the virtual authentication code by using the virtual authentication code generating function, and may determine the virtual authentication code is a normal code when the generating time point is included in an error range set in advance from the receiving time point.

For example, in the financial transaction, it is assumed that the user terminal 100 generates a virtual authentication code used in the user authentication for the account transfer of the user at a time point t1. In addition, when the financial transaction payment server 200 receives the virtual authentication code at a time point t2 through the communicator 140 of the user terminal 100, the server 200 compares t1 with t2 to determine whether the received virtual authentication code is a normal code. When a difference between t1 and t2 or a difference between a first count value corresponding to t1 and a second count value corresponding t2 exceeds a range set in advance, it is determined that the virtual authentication code is not normally generated. As such, a third party acquiring the virtual authentication code of the user and illegally using the virtual authentication code may be prevented.

In addition, in another embodiment of the method of verifying the virtual authorization code, the first code and the second code may be codes for a reference count added by a virtual security code (e.g., OTP code) which is generated randomly from a point in time when the user authentication information is registered by the user terminal 100 or a point in time when the user authentication is requested (e.g., a point in time when the user terminal receives user authentication information data from the user authentication information or a point in time when the user terminal generates the virtual authentication code by using the user authentication information data).

In a detailed embodiment, the virtual authentication code generating unit 10 generates the virtual security code by reflecting the virtual security code to the first code and the second code without outputting the virtual security code to the outside. The virtual authentication code generating unit 20 (e.g., a virtual authentication code generation-dedicated program) generates a virtual authentication code value (e.g., OTP code) based on some of the serial number (e.g., unique value) of the virtual authentication code generating unit (e.g., user terminal 200) and the user information (e.g., card data, biometric data, etc.) or a combination of the user information and the serial number of the dedicated program, generates the first code at a count, to which the virtual security code value is added, at a point in time when the user authentication information is registered, and generates the second code at a count corresponding to the virtual security code value (e.g., generating the virtual security code itself as the second code).

That is, the first code and the second code are generated by the user terminal 100 based on a count shifted by the virtual security code value from a time point A at which the user authentication information 10 is registered to the server 200. The count shifted from the time point A by the virtual security code value may be a count before or after the count corresponding to the current time point according to the generated virtual security code value.

The server that is the virtual authentication code verification unit may search for the storage location (or registration location) of the user authentication information by applying the received first and second codes to the storage location search algorithm. As such, it is impossible for other people to identify an order of providing the first and second code constituting the virtual authorization code, and thus, the security may be improved.

In addition, in another embodiment, the server 200 that is the virtual authentication code verification unit extracts the virtual security code from the second code generated based on the virtual security code, and after that, identifies whether there is a value that is identical with the virtual security code from among the OTP numbers calculated by inputting a count within a certain range from a count, at which the virtual authentication code is received, by using the virtual authentication code generating function (that is, OTP function). In addition, the server 200 that is the virtual authentication code verification unit obtains the virtual security code value (e.g., OTP function value) used to generate the second code by applying an inverse function of the second function to the second code and searches for a count at which a value that is the same as the virtual security code value is calculated.

As there is a difference between a point in time when the user terminal 100, that is, the virtual authentication code generating unit 10, generates the virtual security code and a point in time when the server 200, that is, the virtual authentication code verification unit 20, receives the virtual security code due to the transmission time or delay of the virtual authorization code, a count at which the virtual authentication code verification unit 20 receives the virtual authentication code may not be identical to a count at which the virtual authentication code verification unit 20 receives the OTP number corresponding to the virtual security code.

Thus, the server 200 allows an error range from the count at which the virtual authentication code is received. As such, the server 200 may prevent the user authentication from being performed by using the previously generated virtual authorization code, not the virtual authentication code that is currently generated, and thus, the security may be improved. Also, even when the user does not input a virtual security code of a certain digit when inputting the virtual authorization code, the server 200 itself may search for the virtual security code and verify the user.

Also, in another embodiment, at a time point when the user authentication is requested, the virtual authentication code generating unit 10 generates the first code corresponding to a count, to which the virtual security code generated by using a part of the serial number (i.e., unique value) of the user terminal or the dedicated program and the user information, or a combination of the serial numbers as seed data is added. Here, the second code corresponding to a count obtained by adding a count difference between the time point of registering the user authentication information (time point A) and the time point of requesting the user authentication (time point B) to the virtual security code value is generated. That is, equations for the virtual authentication code generation-dedicated program to generate the first code and the second code are as follows.

$$\text{First code} = f1(\text{count at time point } B + \text{virtual security code})$$

$$\text{Second code} = f2(\text{count at time point } B - \text{count at time point } A + \text{virtual security code})$$

(time point A: a time point when the user authentication information is registered, time point B: count at a time point when the user procedure approval is requested, virtual security code: OTP number)

The server 200 that is the virtual authentication code verification unit 20 searches for a location where the user information is stored based on the first code and the second code in the received virtual authentication code and extracts the seed data (i.e., data used when generating the virtual authentication code from among the serial number of the virtual authentication code generation-dedicated program or the user terminal, user information, and a combination serial number of the serial number of the virtual authentication code generation-dedicated program and the serial number of the user terminal) stored in the corresponding location. The server 200 generates the virtual security code (i.e., OTP number) within a certain count range from a time point of receiving the user authentication request based on the seed data.

After that, as the server 200 searches for the point where the user information is stored based on the first code and the second code, the server 200 identifies the time point of registering the user authentication information (time point A). The server calculates a calculation value corresponding to a sum of the number of counts to each count within a certain count range and the virtual security code (i.e., OTP number), based on the time point of receiving the user authentication request from the time point of registering the user authentication information (time point A), and identifies whether there is a count that is equal to the number of counts corresponding to the second code (that is, a value obtained by applying an inverse function of the second function to the second code) from among the calculated values. As such, the server may identify whether the virtual authentication code is normally provided.

The procedure approval unit 260 approves the procedure requested by the user terminal 100 when the verification of the virtual authentication code is finished by the virtual authentication code verifier 250.

In an embodiment, in a case of user authentication during an account transfer, the user authentication is completed by the user verification unit 240 and the verification that the virtual authentication code is normally generated is completed by the virtual authentication code verifier 250, the procedure approval unit 260 approves the account transfer that is the financial transaction requested by the user.

In addition, according to an embodiment of the present disclosure, there may be a case requiring authentication of a plurality of users according to the field in which the procedure is used. For example, a plurality of user authentication processes through a plurality of virtual authorization codes may be necessary for approving one financial transaction. The financial transaction through a deputy may correspond thereto.

According to an embodiment of the present disclosure, the above financial transaction type which requires the authentication processes for a plurality of users and one procedure approval based on the plurality of virtual authorization codes may be set as a first type financial transaction. For example, the procedure approval request through the deputy may correspond thereto. However, one or more embodiments are not limited thereto.

As described above, with respect to the virtual authentication code generated based on the identification code of the financial transaction type, the server 200 may identify the type of requested financial transaction based on the corresponding virtual authorization code.

In addition, the virtual authentication code according to the first type financial transaction includes a first virtual authentication code and a second virtual authorization code. Here, the first virtual authentication code is generated by a first virtual authentication code generating function in a first user terminal based on first user information, and the second virtual authentication code is generated by a second virtual authentication code generating function in a second user terminal based on second user information. Here, the server receives a request for approving the first type financial transaction by receiving the first virtual authentication code and the second virtual authorization code.

For example, the financial transaction of opening a corporation account may correspond thereto. In order to execute the corresponding financial transaction through an employee of a corporation, authentication of a corporation representative and a certain employee corresponding to the deputy are both required. As such, the server verifies the representative and the deputy by receiving the virtual authorization codes provided from the representative and the deputy.

In addition, in an embodiment of the present disclosure, the first type financial transaction is only approved by the server when the financial transaction identification codes of the first virtual authentication code and the second virtual authentication code are the same as each other.

When describing the above with reference to the above example, the server may approve the financial transaction only when the financial transaction types identified based on the authorization codes are identical to each other. That is, even when the user authentication of the corporation representative is completed based on the first virtual authentication code of the first user, that is, the corporation representative and the user authentication of the deputy is completed based on the second virtual authentication code of the second user, that is, the deputy, the financial transaction may not be approved. Only when the identification codes with respect to the financial transaction identified through the first and second virtual authorization codes are identical to each other, the server would approve the corresponding financial transaction. As such, it may be prevented that the deputy (second user) uses the first virtual authentication code generated through the terminal of the corporation representative (first user) in another financial transaction or illegally uses the name of the corporation representative.

In addition, in an embodiment of the present disclosure, in a case of the first type financial transaction, the server searches for a first storage location in which the first user authentication information of the first user is stored in the storage location search algorithm based on the first virtual authentication code and searches for a second storage location in which the second user authentication information of the second user in the storage location search algorithm based on the second virtual authorization code. Here, the first storage location and the second storage location may not be overlap each other according to the unit count.

In detail, according to a non face-to-face financial transaction providing method based on the virtual authorization code, each user information is stored at each count corresponding to the time point when each user requests user information registration. Therefore, the user information may not be stored in the same location as described above. Here, even when a plurality of users simultaneously request user information registration at the same time point, the server would store the user information at different counts by applying an order of storage location allocation according to a preset criterion (e.g., UID of the user, name, etc.).

Figure 7:
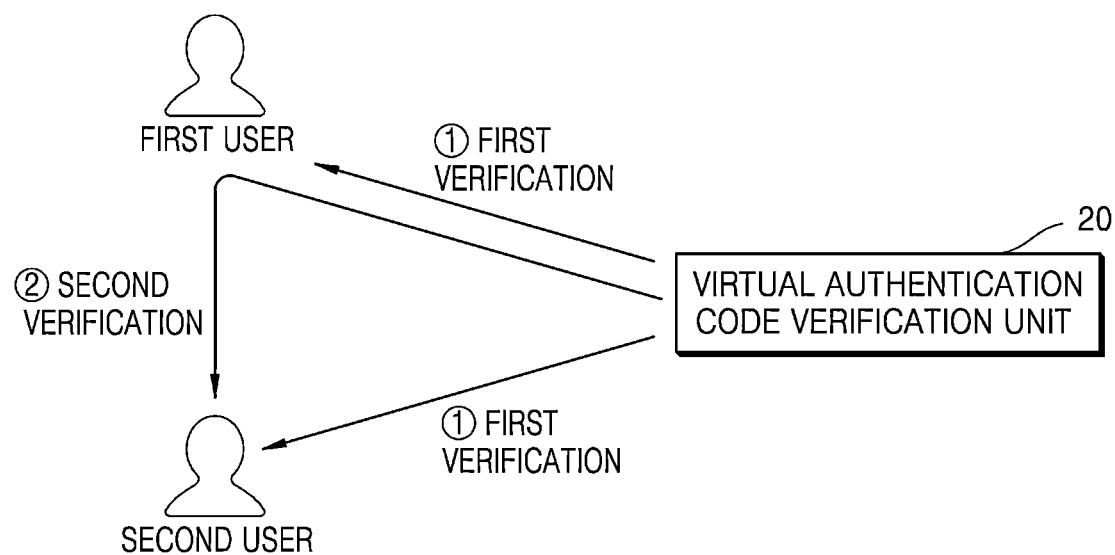
FIG. 7 is a diagram showing an example of user authentication with respect to a first type procedure, according to an embodiment of the present disclosure.

FIG. 7 is a diagram showing an example of user authentication with respect to a first type financial transaction, according to an embodiment of the present disclosure.

Referring to FIG. 7, an embodiment of the present disclosure may further include a process of receiving second user information related to the first type financial transaction from the first user terminal. In addition, the embodiment may further include a second authentication process of the second user with respect to the first type financial transaction based on the second user information provided from the first user terminal and the second user information extracted from the second storage location found based on the second virtual authorization code.

In addition, the second user information (e.g., a cell phone number, UID, etc. of the deputy) may be stored in the first storage location in which the user information about the first user is stored, but may be stored in another storage location connected to the first storage location. The server 200 extracts the second user information from another storage location connected to the first storage location, after finishing the authentication of the first user by using the first user information extracted from the first storage location found based on the first virtual authorization code. In addition, the server extracts the second user information in the second storage location that is found based on the second virtual authorization code, and compares the second user information with the second user information provided from the first user terminal. The server would approve the first type financial transaction only when the second user information is identical.

In addition, the second user information may be stored simultaneously with the registration of the first user information by the server 200 which receives the first user information from the first user terminal, but the first user terminal may be requested to provide the second user information when the virtual authorization codes with respect to the first type financial transaction requiring the plurality of virtual authorization codes are generated.

Here, in an embodiment of the present disclosure, the first virtual authentication code may be generated based on the second user information provided from the first user terminal. That is, the second user information provided from the first user terminal may be used as source data of the virtual authentication code generating function. As such, the server 200 may approve the financial transaction only when the second user information extracted from the first virtual authentication code is the same as the second user information extracted from the second storage location that is found based on the second virtual authorization code.

The method of procedure approval based on the virtual authentication code according to an embodiment of the present disclosure may be implemented as a program (or application) and stored in a medium in order to be combined with a computer, that is, hardware and executed.

According to the embodiment of the present disclosure, the user may generate different virtual authorization codes according to the type of procedure, time, and user information. In addition, based on the virtual authentication code consisting of different values, the server may extract the user authentication information of the corresponding user and perform the user verification.

In particular, when the user performs a financial task, the virtual authentication code may be used on behalf of a seal certificate or public certificate. Here, the user may tag a card registered to the server on the user terminal so as to generate a dedicated virtual authentication code corresponding to the user. It is because the seed data stored in the card is transferred via NFC and the code is generated based on the seed data in the dedicated program and the seed data transferred from the card. As such, the user authentication may be performed by the virtual authentication code that is generated only by using the card of the user and the user terminal.

Also, when it is assumed that an employee of a corporation carries out a certain task on behalf of the representative, the employee may certify that the employee is legally authorized by the representative by writing a virtual authentication code on a document assigned from the representative, wherein the virtual authentication code is generated by the representative tagging a card of the representative on a terminal of the representative (terminal in which a virtual authentication code generating module is installed or included) and corresponds to the representative. Also, when a superior is out of office in a company or institution and a certain task has to be approved, the superior may provide a card and a virtual authentication code that is generated through the terminal of the superior at a certain time point, and then, the virtual authentication code is input to an electronic system and the approval from the superior is replaced.

In order to allow the computer to read the program and execute the methods implemented with the program, the above-described program may include codes encoded in computer languages such as C, C++, JAVA, and machine language which can be read through a device interface of the computer by a processor (CPU) of the computer. This code may include a functional code related to a function or the like that defines functions required to execute the methods, and may include an execution procedure-related control code necessary for the processor of the computer to execute the functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

The recording medium refers to a specific medium that semi-permanently stores data and may be read by an apparatus, rather than a medium, such as a register, a cache, or a buffer, which temporarily stores data. Specifically, the recording medium may include, but is not limited to, a ROM, a RAM, a CD-ROM, a magnetic tape, a floppy disk, an optical data storage device, and the like. That is, the program may be stored in various recording media on various servers to which the computer may access, or in various recording media on the user's computer. The medium may also be distributed over network coupled computer systems so that the computer readable code is stored in a distributive manner.

While the disclosure has been particularly illustrated and described with reference to exemplary embodiments thereof, it will be understood by those of ordinary skill in the art that various changes in form and details may be made therein without departing from the spirit and scope of the disclosure. Thus, the embodiments of the disclosure set forth herein or shown above are to be interpreted in an illustrative and non-limiting sense.

EXPLANATION OF REFERENCE NUMERALS DESIGNATING THE MAJOR ELEMENTS OF THE DRAWINGS

10: virtual authentication code generating unit
20: virtual authentication code verification unit
100: user terminal
110: detailed code generator
120: virtual authentication code generator
130: virtual authentication code providing unit
140: memory
210: communicator
220: detailed code extractor
230: storage location search unit
240: user verification unit
250: virtual authentication code verifier
260: procedure approval unit

The invention claimed is:

1. A method of approving a procedure based on a virtual authorization code, performed by a procedure approval server (hereinafter, 'server'), the method comprising:
receiving, by the server, a virtual authentication code and a request for procedure approval, the virtual authentication code being generated by a virtual authentication code generating function in a user terminal;
searching for, by the server, a storage location of user authentication information of a user in a storage location search algorithm, based on the virtual authorization code;
extracting, by the server, user authentication information stored in the storage location and authenticating the user based on the user authentication information; and
approving the procedure when the user authentication is finished,
wherein the procedure includes a plurality of types of procedures,
an identification code corresponding to each procedure is preset to each of the plurality of procedure types, and
the virtual authentication code is set at a specific time interval based on the user authentication information and the identification code, and is changed at every unit count that is changed over the time interval,
and the approving of the procedure comprises
approving only the procedure corresponding to the identification code,
wherein
the virtual authentication code according to a first type procedure from among the plurality of procedure types includes a first virtual authentication code and a second virtual authorization code,
the first virtual authentication code is generated by a first virtual authentication code generating function in a first user terminal based on first user information,
the second virtual authentication code is generated by a second virtual authentication code generating function in a second user terminal based on second user information,
the receiving of the procedure approval request comprises receiving a request for approval of the first type procedure by receiving the first virtual authentication code and the second virtual authorization code, and
the approving of the procedure is carried out only when identification codes of the first virtual authentication code and the second virtual authentication code are the same as each other.

2. The method of claim 1, wherein
the virtual authentication code is generated by combining a first code with a second code included in a plurality of detailed codes according to a specific rule,
the first code and the second code have a correlation, and
the first code determines a search start point with respect to the storage location in the server and the second code determines a search path with respect to the storage location from the search start point.

3. The method of claim 2, wherein
validity time data of the virtual authentication code is set through the user terminal,
a third code included in the plurality of detailed codes is further generated based on the validity time data, and
the virtual authentication code is generated
by combining the first code, the second code, and the third code according to a specific rule.

4. The method of claim 2, wherein
the virtual authentication code includes
a virtual security code that is generated based on time data regarding a time when the virtual authentication code is generated or time data regarding a time when the procedure approval is requested by the user terminal, and
the server further verifies the virtual authentication code based on the virtual security code.

5. The method of claim 1, wherein
the virtual authentication code is generated based on one of card data provided to the user terminal and biometric data provided to the user terminal.

6. The method of claim 1, wherein
the searching for the storage location comprises
searching for a first storage location in which first user authentication information of a first user is stored in the storage location search algorithm based on the first virtual authentication code and searching for a second storage location in which second user authentication information of a second user is stored in the storage location search algorithm based on the second virtual authorization code, and the first storage location and the second storage location are set so as not to overlap each other according to the unit count.

7. The method of claim 1, further comprising
receiving, by the server, second user information related to the first type procedure from the first user terminal,
wherein the first virtual authentication code is generated based on the second user information provided from the first user terminal, and
the authenticating of the user comprises
authenticating the second user with respect to the first type procedure by comparing the second user information provided from the first user terminal with the second user authentication information extracted from the second storage location that is searched based on the second virtual authorization code.

8. An apparatus for approving a procedure based on a virtual authentication code, the apparatus comprising:
a processor configured to:
receive a request for procedure approval by receiving a virtual authorization code;
extract one or more detailed codes included in the virtual authorization code;
search for a storage location in which user authentication information is registered in a storage location search algorithm based on the extracted one or more detailed codes;
authenticate a user by extracting the user authentication information; and
approve the procedure when the user authentication is completed,
wherein
the procedure includes a plurality of types of procedures,
identification codes corresponding respectively to a plurality of procedures are preset to the plurality of procedure types, the virtual authentication code is set at a specific time interval based on the identification codes and is changed at every unit count that is changed over the time interval,
the processor is configured to approve only the procedure corresponding to the identification code of the procedure,
the virtual authentication code according to a first type procedure from among the plurality of procedure types includes a first virtual authentication code and a second virtual authorization code,
the first virtual authentication code is generated by a first virtual authentication code generating function in a first user terminal based on first user information,
the second virtual authentication code is generated by a second virtual authentication code generating function in a second user terminal based on second user information, and
the processor is further configured to:
receive a request for approval of the first type procedure by receiving the first virtual authentication code and the second virtual authorization code; and
approve the procedure only when identification codes of the first virtual authentication code and the second virtual authentication code are the same as each other.

9. A procedure approval program using a virtual authorization code, which is combined with a computer hardware, and stored in a medium to execute the method according to claim 1.

* * * * *